United States Patent [19]

De Martino

[11] 4,256,473
[45] Mar. 17, 1981

[54] FILTER BAG ATTACHING MEANS

[75] Inventor: Dominick De Martino, Windsor, Conn.

[73] Assignee: The Spencer Turbine Company, Windsor, Conn.

[21] Appl. No.: 82,136

[22] Filed: Oct. 5, 1979

[51] Int. Cl.³ .............................................. B01D 46/02
[52] U.S. Cl. ...................................... 55/379; 55/505
[58] Field of Search ................. 55/375, 378, 379, 502, 55/507, 509, 505; 210/323 T, 459, 452, 462

[56] References Cited

U.S. PATENT DOCUMENTS

| 1,038,223 | 9/1912 | Smith | 55/378 |
|---|---|---|---|
| 3,170,777 | 2/1965 | Held | 55/379 |
| 3,401,505 | 9/1968 | Ballard | 55/379 |
| 3,538,687 | 11/1970 | Pausch | 55/379 |
| 3,680,285 | 8/1972 | Wellan et al. | 55/379 |
| 3,747,307 | 7/1973 | Peshina et al. | 55/379 |
| 3,853,509 | 12/1974 | Leliaert | 55/378 |
| 3,951,627 | 4/1976 | Barr, Jr. et al. | 55/379 |
| 4,149,863 | 4/1979 | Ballard | 55/379 |

FOREIGN PATENT DOCUMENTS 401410 8/1922 Fed. Rep. of Germany ............. 55/378

*Primary Examiner*—David L. Lacey
*Attorney, Agent, or Firm*—McCormick, Paulding & Huber

[57] ABSTRACT

Apparatus for filtering dust particles from air has a bag head and a bag assembly which includes a filter bag and a skeletal bag frame received within the bag. A cylindrical bag frame collar secured to the upper end of the bag frame threadably engages a cylindrical bag head collar which depends from the bag head. Threads on the head collar are formed by rods tack welded to the outer surface of the collar. The bag frame collar receives the head collar therein and has two rivets and an adjustable bolt equiangularly spaced and projecting radially inwardly to engage the threads on the head collar. The bolt serves to lock the two collars in assembly and prevent relative rotation and loosening due to vibration.

9 Claims, 6 Drawing Figures

FILTER BAG ATTACHING MEANS

BACKGROUND OF THE INVENTION

This invention relates in general to filtering apparatus which has at least one bag filter assembly, which includes a flexible tubular gas permeable filter element or fabric filter bag for separating particulate matter from gas, and deals more particularly with an improved arrangement for releasably securing the bag assembly to the apparatus.

In an apparatus of the aforedescribed general type the bag filter assembly is usually supported within a filtration chamber. The flexible tubular bag filter is supported by an elongated tubular skeletal bag support frame which is received within the bag filter. The support frame is secured to the wall of the filtration chamber in association with a clean-air outlet opening in the chamber wall. Dust-laden air is drawn into the filtration chamber and exhausted through the clean-air outlet opening causing particulate matter to accumulate on the surfaces of the bag filter. Dust particles which accumulate on the surface and in the pores of the permeable bag filter ultimately reduce its efficiency. The bag filter assembly must occasionally be removed from the filtration chamber to facilitate bag cleaning, repair or replacement. The present invention is concerned with an improved arrangement for attaching the bag filter assembly to the apparatus whereby it may be easily removed and replaced, as required. A further aim of the invention is to provide an improved bag filter assembly attaching arrangement which may be secured to resist loosening due to vibration inherent in the operation of such apparatus.

SUMMARY OF THE INVENTION

In accordance with the present invention a filtering apparatus having a bag head and a bag assembly including a bag filter and a skeletal bag frame received within the bag filter includes an improved means for supporting the bag filter assembly on the bag head. A cylindrical bag head collar is mounted on the bag head and a cylindrical bag frame collar is secured to the bag frame. One of the collars is received within the other of the collars. A plurality of studs mounted in angularly spaced relation on one of the collars projects in one generally radial direction therefrom and is engaged with means defining a thread on the other of the collars whereby the bag filter assembly is releasably retained in assembly with the bag head.

DETAILED DESCRIPTION OF PREFERRED EMBODIMENT

Figure 1:
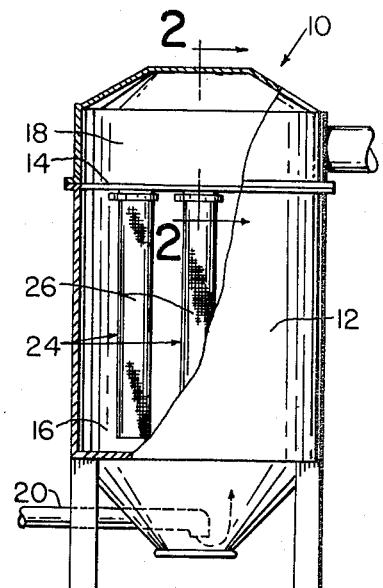
FIG. 1 is a side elevational view of a filtering apparatus embodying the present invention, a part of the housing shown broken away to reveal structure therein.

Turning now to the drawing and referring particularly to FIG. 1, an industrial air filtering apparatus embodying the present invention and indicated generally by the reference numeral 10 comprises a housing 12 having a partition or bag head 14 which separates a filtration chamber 16 in the lower part of the housing from a clean-air chamber 18 in the upper part of the housing. Dust-laden air enters the filtration chamber 16 through an air inlet conduit 20. An air outlet duct communicates with the clean-air chamber 18 and connects with a suction fan or the like (not shown) which pulls a vacuum on the filtering apparatus through the clean-air chamber 18. A plurality of gas permeable tubular bag filter assemblies, indicated generally at 24, 24, and disposed within the filtration chamber 16 are supported on and depend from the bag head 14. Each filter assembly 24 comprises a tubular bag filter 26 and an associated skeletal supporting structure or frame indicated generally at 27 and shown in FIGS. 2 and 6. In accordance with the present invention, each bag filter assembly 24 is releasably secured to the bag head 14 in association with an air inlet opening in the bag head, as will be hereinafter further described.

Figure 2:
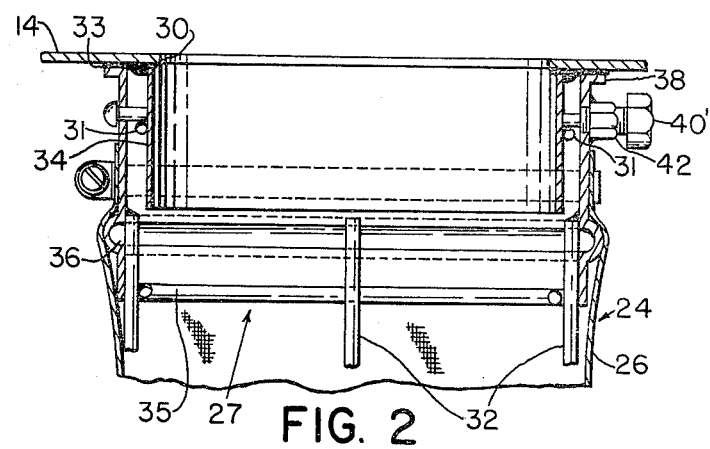
FIG. 2 is a somewhat enlarged fragmentary view shown partially in section taken along the line 2—2 of FIG. 1.
Figure 3:
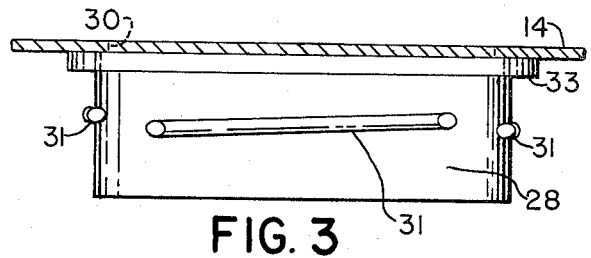
FIG. 3 is a fragmentary side elevational view of the bag head and bag head collar.
Figure 5:
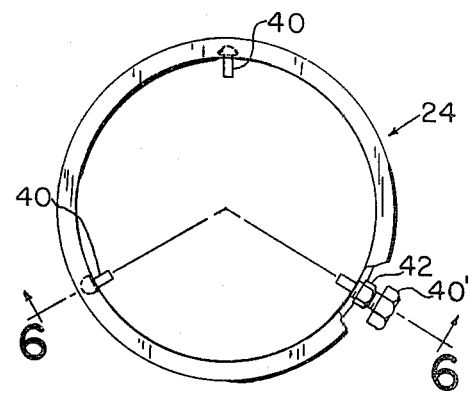
FIG. 5 is a plan view of the bag filter assembly.
Figure 4:
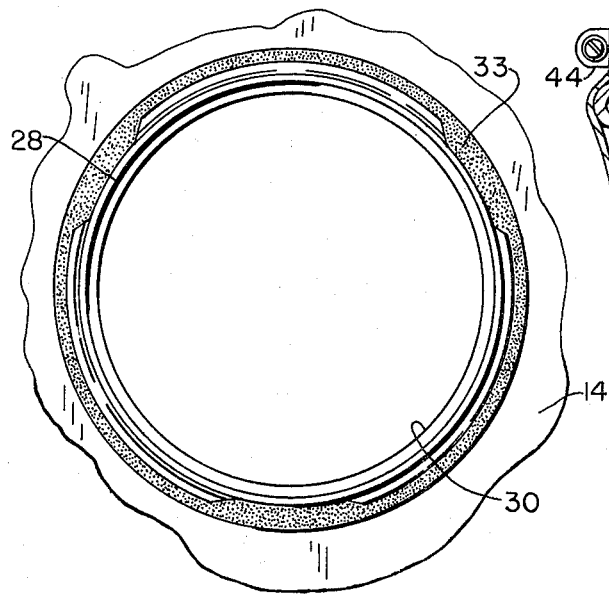
FIG. 4 is a fragmentary bottom view of the bag head and bag head collar shown in FIG. 3.

Considering now the arrangement for releasably securing a typical bag filter assembly 24, and referring more particularly to FIGS. 2-6, the bag head 14 has a generally cylindrical bag head collar 28 mounted thereon in generally coaxial alignment with a circular air inlet opening 30 formed in the bag head, as best shown in FIG. 2. The bag head collar is welded or otherwise suitably secured to the bag head and depends from it, substantially as shown in FIGS. 2 and 3. At least one male thread is formed on the bag collar 28. Preferably, and as shown, the thread is formed by a plurality of arcuate lengths of rod 31, 31 tack welded or otherwise secured to the outer surface of the cylindrical collar 28. A resilient annular gasket 33, which is preferably made from sponge rubber or the like, closely surrounds the upper end of the bag head collar 28.

Figure 6:
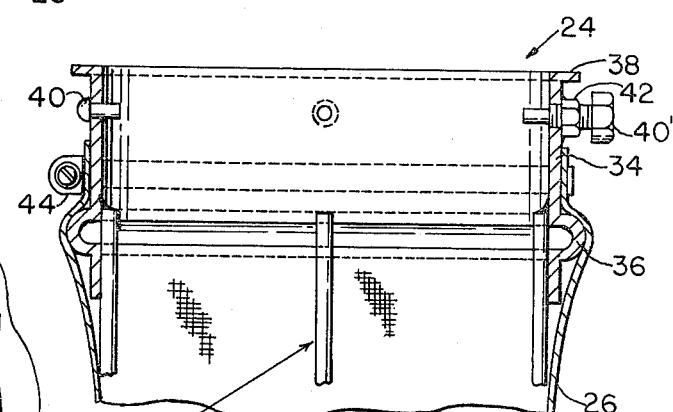
FIG. 6 is a fragmentary sectional view taken along the line 6—6 of FIG. 5.

Considering now the associated bag filter assembly 24 in further detail, the skeletal bag frame 27 is formed by a plurality of vertically elongated rods 32, 32 connected by a plurality of axially spaced apart annular rings 35, 35 (one shown), in a manner well-known in the art. A cylindrical bag frame collar 34 is welded or otherwise attached to the upper ends of the rods 32, 32 which comprise the bag frame 28. The collar 34 has a radially outwardly projecting bead 36 which surrounds its lower end and a radially outwardly extending annular flange 38 at its upper end, as best shown in FIG. 6. A plurality of equiangularly spaced studs 40, 40 are mounted on the collar 34 intermediate the bead 36 and the flange 38 and extend radially inwardly for some distance beyond the inner peripheral surface of the collar 34. The studs are arranged for cooperative threadable engagement with the threads formed on the bag head collar 28 by the rods 31, 31. Preferably, and as shown, one of the studs comprises a threaded fastener engaged with a nut 42 welded or otherwise secured to the outer surface of the collar 34. The threaded stud, indicated at 40', is radially adjustable relative to the collar 34, for a purpose which will be hereinafter further evident.

The bag filter 26 is made from gas permeable fabric and receives the support frame 27 therein. It is secured at its upper end to the bag frame collar 34 by an annular clamping band 44 which surrounds the upper portion of the bag filter and an associated portion of the bag frame collar 34 above the bead 36.

The illustrated bag assembly 24 is attached to the bag head 14 by slipping the bag frame collar 34 upwardly over the bag head collar 28 to engage the studs 40, 40 and 40' with the thread formed by the rods 31, 31. The pitch of the thread and its dimensional relationship to the gasket 33 is such that rotation of the bag assembly relative to the bag head and through an angle less than 120° is sufficient to effect connecting engagement between the bag assembly 24 and the bag head. In assembly, the flange 38 bears against the lower surface of the gasket 33 to effect a substantially air-tight seal between the upper end of the bag filter assembly and the bag head. The resilient gasket 33 is somewhat compressed in assembly and aids in retaining the bag assembly in assembled relation with the bag head.

The bag assembly may be subjected to considerable vibration during operation, due to fluctuations in the flow of air through the various bag filters. If desired, the adjustable stud 40' may be tightened into gripping engagement with its associated bag head collar 28, after assembly, to positively releasably lock the bag filter assembly in connected relation to the bag head 14.

I claim:

1. In an air filtering apparatus having a bag head, a bag filter assembly including a filter bag and a skeletal bag frame received within the filter bag and means for supporting the bag filter assembly on the bag head the improvement wherein said supporting means comprises a cylindrical bag head collar mounted on said bag head, a cylindrical bag frame collar mounted on said bag frame, one of the collars received in the other of the collars, a plurality of studs mounted in angularly spaced relation on one of said collars and projecting in one generally radial direction from said one collar, means for defining a thread on the other of said collars threadably engaged with said studs, and clamping means for releasably securing said collars in clamped relation to each other, said clamping means comprising one of said studs.

2. In a filtering apparatus as set forth in claim 1 the further improvement wherein said one stud is threadably connected to said one collar for radial adjustment relation thereto.

3. In a filtering apparatus as set forth in either claim 1 or claim 2 including means for releasably securing said filter bag to said bag frame collar.

4. In a filtering apparatus as set forth in claim 3 the further improvement wherein said means for releasably securing said bag comprises a clamping band surrounding associated portions of said filter bag and said bag frame collar.

5. In a filtering apparatus as set forth in claim 4 the further improvement wherein said bag frame collar has a radially outwardly projecting annular bead formed thereon.

6. In a filtering apparatus as set forth in either claim 1 or claim 2 the further improvement including a resilient annular gasket disposed adjacent said bag head and said bag head collar and a radially outwardly projecting annular flange on said bag frame collar engaging said gasket when said studs are threadably engaged with said thread.

7. In a filtering apparatus as set forth in either claim 1 or claim 2 the further improvement wherein said bag head collar comprises said one collar and said bag frame collar comprises said other collar.

8. In an air filtering apparatus having a bag head, a bag filter assembly including a filter bag and a skeletal bag frame received within the filter bag and means for supporting the bag filter assembly on the bag head the improvement wherein said supporting means comprises a cylindrical bag head collar mounted on said bag head, a cylindrical bag frame collar mounted on said bag frame, one of the collars received in the other of the collars, a plurality of studs mounted in angularly spaced relation on one of said collars and projecting in one generally radial direction from said one collar, and means for defining a thread on the other of said collars in threadable engagement with said studs.

9. In a filtering apparatus as set forth in claim 8 the further improvement wherein said bag head collar comprises said one collar and said bag frame collar comprises said other collar.

* * * * *